(12) United States Patent
Hyde et al.

(10) Patent No.: US 6,197,419 B1
(45) Date of Patent: Mar. 6, 2001

(54) BLENDED ADHESIVES AND ARTICLES INCORPORATING THE SAME

(75) Inventors: Patrick D. Hyde, Burnsville; James L. White, Stillwater; Jon E. Stickrod, Oakdale, all of MN (US); Bryan C. Feisel, Hudson, WI (US)

(73) Assignee: 3M Innovative Properties Co., St. Paul, MN (US)

( * ) Notice: Subject to any disclaimer, the term of this patent is extended or adjusted under 35 U.S.C. 154(b) by 0 days.

(21) Appl. No.: 08/970,255

(22) Filed: Nov. 14, 1997

Related U.S. Application Data

(63) Continuation of application No. 08/934,479, filed on Sep. 19, 1997, now abandoned.

(51) Int. Cl.[7] .................................................. C09J 7/02
(52) U.S. Cl. ................................. 428/354; 428/355 BL
(58) Field of Search .............................. 428/354, 355 BL

(56) References Cited

U.S. PATENT DOCUMENTS

| | | | |
|---|---|---|---|
| 3,984,509 | 10/1976 | Hall et al. | 264/40.1 |
| 4,411,954 | 10/1983 | Butch, III et al. | 428/343 |
| 4,699,842 | 10/1987 | Jorgensen et al. | 428/343 |
| 4,835,217 | 5/1989 | Jorgensen et al. | 525/93 |
| 5,028,485 | * 7/1991 | Van Hooijdonk | |
| 5,085,655 | * 2/1992 | Mann | |

FOREIGN PATENT DOCUMENTS

| | | |
|---|---|---|
| 0 401 509 A1 | 12/1990 | (EP) . |
| 62-53386 | 3/1987 | (JP) . |
| 7-157738 | 6/1995 | (JP) . |
| WO 93/07228 | 4/1993 | (WO) . |
| WO 95/30721 | 11/1995 | (WO) . |
| WO 96/25469 | 8/1996 | (WO) . |

OTHER PUBLICATIONS

*Handbook of Pressure–Sensitive Adhesive Technology*,Second Edition, D.Satas, ed., VanNostrand Reinhold, New York, NY, 1989, pp. 168–171.

* cited by examiner

*Primary Examiner*—Jenna Davis
(74) *Attorney, Agent, or Firm*—David B. Patchett

(57) ABSTRACT

The present invention provides an adhesive article including a pressure-sensitive adhesive composition which exhibits ultraviolet radiation resistance and has a midblock $T_g$ of about −5° C. to about −30° C. at a frequency of about 1.0 Hz. An adhesive article according to the invention is suitable for use in window insulation kits because of its improved stability over a wide temperature range and upon exposure to ultraviolet radiation (UV) as well as its adhesion to low energy surfaces, such as a surface of films made from polyolefins.

25 Claims, 6 Drawing Sheets

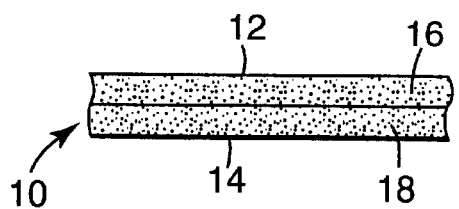
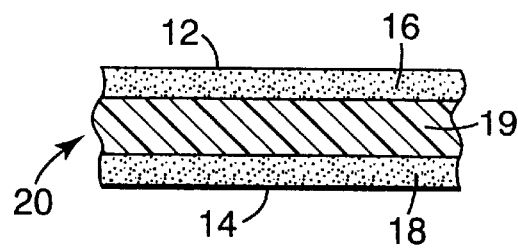
Fig. 2A  Fig. 2B
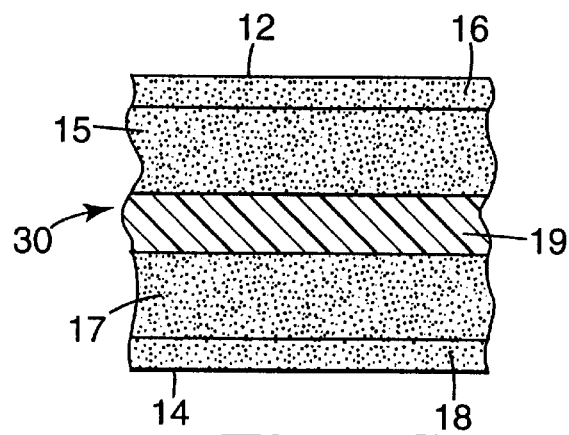
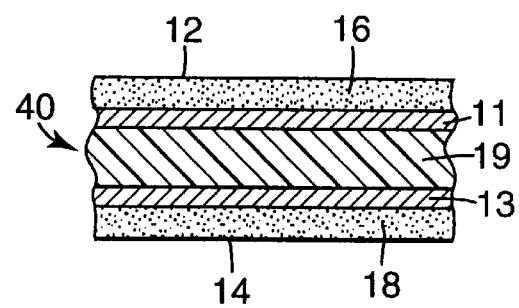
Fig. 2C  Fig. 2D
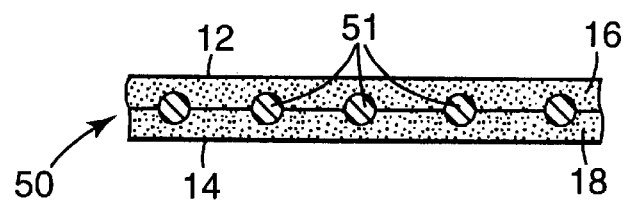
Fig. 2E

US 6,197,419 B1

BLENDED ADHESIVES AND ARTICLES INCORPORATING THE SAME

CROSS-REFERENCE TO RELATED APPLICATION

This application is a continuation application of U.S. Ser. No. 08/934,479, filed Sep. 19, 1997, now abandoned.

BACKGROUND OF THE INVENTION

This invention relates to pressure-sensitive adhesives and sheet material, including tapes and the like, coated therewith.

Three properties which are useful in characterizing the nature of pressure-sensitive adhesives are tack, peel strength, and shear strength. The first measures the ability of the adhesive to adhere quickly, the second its ability to resist removal by peeling back on itself from a surface, and the third its ability to hold in position when shearing forces are exerted. Generally speaking, the first two are directly related to each other but are inversely related to the third, cf, e.g., Sanderson U.S. Pat. No. 4,077,926, Column 1, lines 31–36. For example, although a given adhesive may exhibit high tack and high peel strength, the shear strength may be unacceptable for the intended purpose. Conversely, while an adhesive may exhibit high shear strength, the tack and peel adhesion may be unacceptable for the intended purpose. These shortcomings are often exacerbated at extremes of high and low temperature.

Modern industry presents a number of situations where pressure-sensitive adhesive products having balanced properties (i.e., excellent tack, peel strength, and shear strength) would be highly desirable. Some examples of these situations include installation of adhesive-coated substrates, e.g. tapes, at low temperatures. In these same situations, it is often necessary to have high peel strength at high temperatures.

Over the past several years rising energy costs have prompted occupants of buildings to conserve energy by means of insulation. The installation of, for example, shrinkable film or shrinkable/stretchable film over windows by means of double-stick tape (tape bearing a layer of adhesive on both major surfaces thereof) adhered to the interior window frame and to the film is known to exert a constant force at the film-adhesive interface and provide a degree of insulation. Generally, the film is located between the window pane and the interior of the building. Under normal room temperature conditions, the adhesive has physical properties which allow it to maintain a bond to the film and the interior window frame. However, window insulation may also be accomplished by adhering a film to the exterior window frame. There are many reasons for installing insulating film on the exterior part of the window. Some users may not want tape on their interior walls or interior window frames, they may want ready access to their windows, or they may have ornate window sills or frames which would hinder installation of the film on the inside. If the film is installed outdoors, the adhesive will be subjected to high temperatures during summer months and low temperatures during winter months. Of particular concern is the fact that, at elevated temperatures, the peel strength and shear strength of conventional pressure-sensitive adhesives is greatly reduced. At the same time the film is exerting shrink tensions as high as $510^{pounds/in^2}$ causing the bond to fail and the film to pull away from the exterior window frame. At reduced temperatures conventional pressure-sensitive adhesives have greatly reduced tack properties, making it difficult to create an adhesive bond with the film or window frame. The adhesive will be exposed to ultraviolet radiation, in addition to temperature fluctuations, that may also cause reduced tack properties.

Rubber based adhesives, which are normally used for installation of shrinkable film currently commercially available, exhibit poor weathering characteristics, loss of tack at low temperatures, e.g. 0° C., and loss of shear at high temperature, e.g. 60° C.

Thus, there is a need for pressure-sensitive adhesives which have balanced adhesive properties over a wide temperature range, good resistance to ultraviolet radiation, good adhesion to plastic films which for the most part have low energy surfaces and which can be prepared easily and economically on conventional equipment.

SUMMARY OF THE INVENTION

Pressure-sensitive adhesives require a delicate balance of viscous and elastic properties that result in a four-fold balance of adhesion, cohesion, stretchiness, and elasticity. This balance is further compounded when the end-use of the pressure-sensitive adhesive is considered. For example, the cohesion and elasticity are typically considerations when it is desired that the pressure-sensitive adhesive is to be useful over a wide temperature and be stable upon exposure to ultraviolet radiation (UV). Accordingly, the present invention involves adhesive articles including adhesive compositions that are useful over a wide temperature range and have improved UV resistance. Preferably, an adhesive composition is a pressure-sensitive adhesive that exhibits adhesion to low energy surfaces, such as a surface of films made from polyolefins (e.g., polyethylene).

In one aspect of the invention, an adhesive article includes a backing having a first major surface and a second major surface; an adhesive composition on at least the first major surface of the substrate, wherein the adhesive composition includes a styrene block copolymer blend containing styrene-isoprene-styrene (SIS) and styrene-(ethylene-butylene)-styrene (SEBS); and a tackifier component containing a hydrogenated hydrocarbon resin. In accordance with the invention, the adhesive exhibits ultraviolet radiation resistance and has a midpoint glass transition temperature of about −5° C. to about −30° C. at a frequency of about 1.0 Hz.

In another aspect of the invention, an adhesive article includes a backing having a first major surface and a second major surface; an adhesive composition on at least the first major surface of the substrate, wherein the adhesive composition includes a pressure-sensitive adhesive component comprising a natural rubber, a synthetic rubber, a styrene block copolymer, a polyvinyl ether, an acrylate, a poly-α-olefin, a silicone, or mixtures thereof; and a tackifier component comprising a hydrogenated hydrocarbon resin, wherein the adhesive composition exhibits ultraviolet radiation resistance and has a midpoint glass transition temperature of about −5° C. to about −30° C. at a frequency of about 1.0 Hz.

In a further aspect of the invention, an adhesive article is provided having two surfaces formed from two simultaneously melt processed normally tacky pressure-sensitive adhesive compositions. Preferably, at least one of the simultaneously melt processed normally tacky pressure-sensitive adhesives includes a styrene block copolymer blend comprising styrene-isoprene-styrene and styrene-(ethylene-butylene)-styrene; and a tackifier component containing a hydrogenated hydrocarbon resin, wherein the adhesive composition exhibits ultraviolet radiation resistance and has a midpoint glass transition temperature of about −5° C. to about −30° C. at a frequency of about 1.0 Hz.

A method for making an adhesive article is also provided that involves providing at least two molten streams comprising a first and a second pressure-sensitive adhesive composition. Preferably, at least one of the pressure-sensitive adhesive compositions includes a styrene block copolymer blend including styrene-isoprene-styrene and styrene-(ethylene-butylene)-styrene; and a tackifier component containing a hydrogenated hydrocarbon resin, wherein the adhesive composition exhibits ultraviolet radiation resistance and has a midpoint glass transition temperature of about −5° C. to about −30° C. at a frequency of about 1.0 Hz. In addition, a third molten stream including a non-pressure-sensitive adhesive polymeric composition is also provided in the method.

The method further includes combining the three molten streams into a single molten extrudate having the third molten stream between the at least two molten streams of a first and a second pressure-sensitive adhesive composition and depositing the single molten extrudate onto a solid substrate so that a first surface of the first pressure-sensitive adhesive contacts a surface of the solid substrate. The single molten extrudate is then cooled. Preferably, the third molten stream comprises a non-pressure-sensitive adhesive polymeric composition comprising polypropylene, for example, syndiotactic or isotactic polypropylene, a polyamide, for example, an amorphous polyamide, a polyester, for example, an amorphous polyester, preferably glycol treated polyethylene terephthalate, and mixtures thereof.

Another aspect of the present invention is an adhesive composition that includes a styrene block copolymer blend comprising styrene-isoprene-styrene and styrene-(ethylene-butylene)-styrene; and a tackifier component including a hydrogenated hydrocarbon resin. The adhesive composition exhibits ultraviolet radiation resistance and has a midpoint glass transition temperature of about −5° C. to about −30° C. at a frequency of about 1.0 Hz.

A further aspect of the present invention involves a kit for providing insulation, particularly for installation over a window on either an exterior window frame or an interior window frame. The kit includes an adhesive article of the present invention having a pressure-sensitive adhesive on at least two opposing surfaces of a backing, and a film of the type typically used to insulate windows. Accordingly, a typical film is preferably stretchable, shrinkable, or stretchable/shrinkable. Because the pressure-sensitive adhesive of the invention is formulated to allow repositioning of the adhesive article and the film, the kit is particularly well adapted for use by relatively unskilled installers. More importantly, the characteristics of the pressure-sensitive adhesive renders it suitable for either indoor or outdoor use. Quite unexpectedly, it was found that an adhesive article including a pressure-sensitive adhesive containing a styrene block copolymer blend having a ratio of about 1 part to about 3 parts styrene-isoprene-styrene to about 1 part styrene-(ethylene-butylene)-styrene tackified with a hydrogenated hydrocarbon resin exhibited enhanced resistance to ultraviolet radiation as compared to a styrene block copolymer blend tackified with substantially no hydrogenated hydrocarbon resin.

BRIEF DESCRIPTION OF THE DRAWINGS

FIGS. 2A–2E show cross-sectional views of various embodiments of an adhesive article in accordance with the invention;

DESCRIPTION OF PREFERRED EMBODIMENTS

Figure 1:
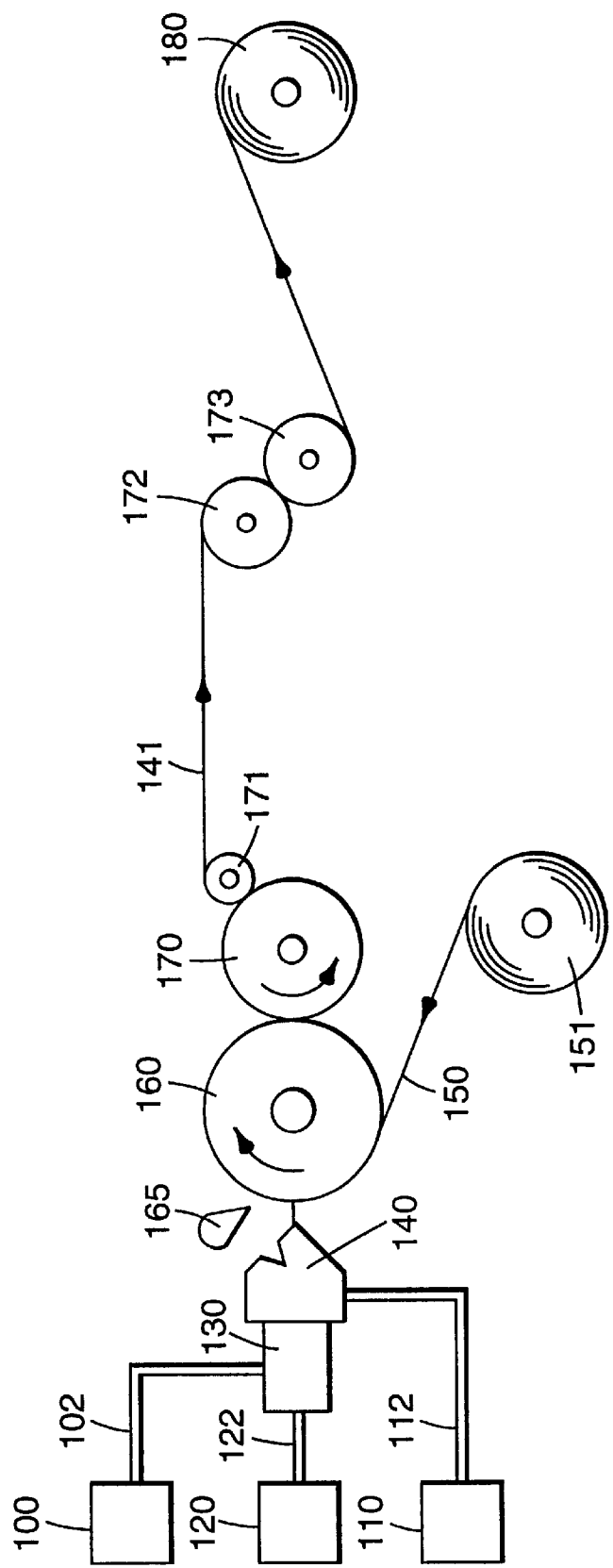
FIG. 1 is a schematic diagram of a system useful to manufacture an adhesive article in accordance with the invention.

The present invention provides a pressure-sensitive adhesive composition. "Pressure-sensitive adhesive (PSA)" as used herein, means that the composition exhibits pressure-sensitive adhesive properties as described in *The Handbook of Pressure-Sensitive Adhesive Technology*, page 172, paragraph 1 (edited by D. Satas, 1989). Preferable pressure-sensitive adhesive compositions in accordance with the invention are hot-melt processable and meet the Dahlquist criteria at use temperatures.

The pressure-sensitive adhesive composition comprises a styrene block copolymer blend containing styrene-isoprene-styrene and styrene-(ethylene-butylene)-styrene; and a tackifier component containing a hydrogenated hydrocarbon resin, wherein the adhesive composition exhibits enhanced ultraviolet radiation resistance and has a midblock $T_g$ of about −5° C. to about −30° C. at a frequency of about 1.0 Hz.

Preferably, the adhesive composition includes the styrene block copolymer blend of styrene-isoprene-styrene and styrene-ethylene-butylene-styrene in a ratio of about 1 to about 3 parts styrene-isoprene-styrene to about 1 part styrene-ethylene-butylene-styrene. More preferably, the adhesive composition includes a total rubber fraction of about 50 weight percent to about 60 weight percent. Quite unexpectedly, it was found that a pressure-sensitive adhesive containing a tackified styrene block copolymer blend having these copolymer ratios exhibited sufficient adhesion as well as good cohesive strength to a polymeric film, e.g., polyolefin, so that a window insulation kit incorporating the pressure-sensitive adhesive is suitable for use both for indoor and outdoor application.

In another embodiment, the pressure-sensitive adhesive composition of the present invention comprises a pressure-sensitive adhesive component wherein the adhesive composition exhibits enhanced ultraviolet radiation resistance and has a midblock $T_g$ of about −5° C. to about −30° C. at a frequency of about 1.0 Hz. Pressure-sensitive adhesive components useful in the present invention include natural rubbers including tackified natural rubbers, synthetic rubbers, tackified styrene block copolymers, polyvinyl ethers, acrylics, poly-α-olefins, and silicones.

In addition, a pressure-sensitive adhesive composition in accordance with the present invention can comprise a combination of a styrene block copolymer blend containing styrene-isoprene-styrene and styrene-(ethylene-butylene)-styrene and a pressure-sensitive adhesive component comprising any of natural rubbers including tackified natural rubbers, synthetic rubbers, tackified styrene block copolymers, polyvinyl ethers, acrylics, poly-α-olefins, and silicones, and a tackifier component comprising a hydrogenated hydrocarbon resin, wherein the adhesive composition exhibits enhanced ultraviolet radiation resistance and has a midblock $T_g$ of about −5° C. to about −30° C. at a frequency of about 1.0 Hz.

Useful natural rubber pressure-sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as a controlled viscosity rubber grade and a ribbed smoked sheet rubber grade.

Useful synthetic rubbers are generally rubbery elastomers, which are either non-tacky and require tackifiers or are self-tacky. Self-tacky synthetic rubber pressure-sensitive adhesives include for example, butyl rubber, a copolymer of isobutylene with less than 3 percent isoprene, polyisobutylene, a homopolymer of isoprene, polybutadiene, or styrene/butadiene rubber. Butyl rubber pressure-sensitive adhesives often contain an antioxidant such as zinc dibutyl dithiocarbamate. Polyisobutylene pressure-sensitive adhesives do not usually contain antioxidants. Synthetic rubber pressure-sensitive adhesives, which generally require tackifiers, are also generally easier to melt process. An example of a synthetic rubber is available under the trade designation "AMERIPOL 1011A," a styrene/butadiene rubber available from BF Goodrich.

Styrene block copolymer pressure-sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure-sensitive adhesives include linear, radial, star and tapered styrene-isoprene block copolymers such as those available under the trade designations "KRATON D1107P," available from Shell Chemical Co., and "EUROPRENE SOL TE 9110," available from EniChem Elastomers Americas, Inc.; linear styrene-(ethylene-butylene) block copolymers available under the trade designation "KRATON G1657," available from Shell Chemical Co.; linear styrene-(ethylene-propylene) block copolymers available under the trade designation "KRATON G1750X," available from Shell Chemical Co.; and linear, radial, and star styrene-butadiene block copolymers available under the trade designations "KRATON D1118X," available from Shell Chemical Co., and "EUROPRENE SOL TE 6205," available from EniChem Elastomers Americas, Inc. The polystyrene blocks tend to form domains in the shape of spheroids, cylinders, or plates that causes the block copolymer pressure-sensitive adhesives to have two phase extrudates. Resins that associate with the rubber phase generally develop tack in the pressure-sensitive adhesive. Examples of rubber phase associating resins include aliphatic olefin-derived resins, such as those available under the trade designations "ESCOREZ 1300" series and the "WING-TACK" series, from Goodyear; rosin esters, such as those available under the trade designations "FORAL" series and "STAYBELITE Ester 10," both from Hercules, Inc.; hydrogenated hydrocarbons, such as that available under the trade designation "ESCOREZ 5000" series, from Exxon; polyterpenes, such as those available under the trade designation "PICCOLYTE A" series; and terpene phenolic resins derived from petroleum or terpentine sources, available under the trade designation "PICCOFYN A100," from Hercules, Inc.

Tackifiers

The properties of pressure-sensitive adhesive compositions depend primarily on the viscoelastic nature of the composition. In a pressure-sensitive adhesive formulation, an elastomer typically provides the elastic component, while a low molecular weight tackifying resin (i.e., a tackifier) constitutes the viscous component. Thus, it is the tackifier that generally determines the viscoelastic behavior and the final properties of the finished adhesive.

Generally, acceptable tackifiers exhibits three fundamental properties. First, it should be substantially compatible with the base adhesive formulation. Second, it should have a relatively low molecular weight as compared to the base elastomer. And third, it should have a glass transition temperature ($T_g$) higher than the base elastomer.

Tackifiers generally fall within two main classes: rosin derivatives and hydrocarbon resins.

A tackifier component of the present invention includes a hydrogenated hydrocarbon resin. Typically, these are produced by hydrogenating hydrocarbon ($C_9$ or dicyclopentadiene) and pure monomer resins. The presence of a hydrogenated hydrocarbon resin provides the pressure-sensitive adhesive with sufficient ultraviolet radiation resistance and some compatibility with the SEBS (styrene-ethylene-butylene-styrene) portion of the styrene block copolymer blend. Suitable hydrogenated hydrocarbon resins for use in the invention include those available under the trade designations "REGALREZ 1018" and "REGALREZ 1085" both commercially available from Hercules Inc. Preferably, the tackifier component includes about 30 weight percent to about 70 weight percent of a hydrogenated hydrocarbon resin. More preferably, the tackifier component further includes a tackifier having about 5 carbon atoms (i.e., a $C_5$ tackifier), wherein the hydrogenated hydrocarbon resin accounts for about 30 weight percent to about 70 weight percent of the tackifier component.

Other tackifiers that are useful include derivatives of rosins such as that available under the trade designation "FORAL 85," a stabilized rosin ester from Hercules, Inc., such as available that under the trade designations "SNOWTACK" series of gum rosins from Tenneco, and tall oil rosin series available under the trade designation of "AQUATAC" from Sylvachem; and synthetic hydrocarbon resins available under the trade designations "PICCOLYTE A" series, polyterpenes from Hercules, Inc., available under the trade designations "ESCOREZ 1300" series of $C_5$ aliphatic olefin-derived resins and the "ESCOREZ 2000" series of $C_9$ aromatic/aliphatic olefin-derived resins. Other materials can be added for special purposes, including hydrogenated butyl rubber, pigments, plasticizers, liquid rubbers, available under the trade designation "VISTANEX LMMH" polyisobutylene liquid rubber available from Exxon, and curing agents to vulcanize the adhesive partially.

Optional Additives

Additionally, the adhesive composition may include optional additives such as a plasticizer, a colorant, a photostabilizer, preferably in an amount of about 10% by weight or less of the adhesive composition. These additives may be added to pressure-sensitive adhesives of the present invention to enhance or obtain particular properties. Suitable optional additives are those that preferably do not interfere with the film forming and performance qualities (e.g., adhesion and cohesion properties) of a pressure-sensitive adhesive according to the invention. Particularly useful optional additives include plasticizers; catalysts; defoamers; flow and leveling agents; colorants (e.g., a dye or a pigment); adhesion promoters for use with certain substrates; thixotropic agents; biocides/anti-fungal agents; corrosion inhibitors; antioxidants; photostabilizers; organic solvents (e.g., coalescing solvents to assist in film formation); and surfactants/emulsifiers.

Plasticizers are particularly useful optional additives and are used, for example, to decrease hardness and modulus at room temperature, eliminate drawing, enhance pressure-sensitive tack, reduce melt and solution viscosity, and decrease cohesive strength or increase plasticity if desired. Exemplary plasticizers preferably include mineral oil, liquid polybutenes, liquid polyacrylates, certain phthalates, lanolin, and mixtures thereof. Preferably, a pressure-sensitive adhesive according to the invention includes about 10 weight percent or less of a plasticizer. A particularly useful plasticizer in a pressure-sensitive adhesive according to the invention is mineral oil. Suitable commercially available plasticizers include a paraffinic hydrocarbon oil, for example, a white mineral oil commercially available under the trade designation "SUPERLA" from Amoco Oil Corp., and a white mineral oil commercially available under the trade designation "KAYDOL" from Witco.

Antioxidants are another type of particularly usefuil optional additives and are used to retard the oxidative attack on the pressure-sensitive adhesive, which can result in loss of the cohesive strength of the pressure-sensitive adhesive. Useful antioxidants include but are not limited to amines, such as N-N' di-β-naphthyl-1,4-phenylenediamine, available under the trade designation "AGERITE D"; phenolics, such as 2,5-di-(t-amyl) hydroquinone, available under the trade designation "SANTOVER A," from Monsanto Chemical Co., tetrakis(methylene 3-(3',5'-di-tert-butyl-4'-hydroxyphenyl)propianate)methane, available under the trade designation "IRGANOX 1010" from Ciba-Geigy Corp., and 2-2'-methylenebis(4-methyl-6-tert butyl phenol), available under the trade designation "ANTIOXIDANT 2246"; and dithiocarbamates, such as zinc dithiodibutyl carbamate.

Photostabilizers are also useful optional additives, such as that available under the trade designation "CYANOX LDTP," from American Cyanamid.

Adhesive Article

An adhesive article of the present invention comprises an adhesive composition as described above on at least one major surface of a backing have a first and second major surface. Preferably, the backing is formed from a polymer comprising polypropylene, polyamide, polyester, for example, polyethylene terephthalate, and mixtures thereof. An adhesive composition may be on one or both surfaces of the backing. When adhesive compositions are coated on both the surfaces of the backing, they can be the same or different adhesive compositions. The adhesive composition may include a pressure-sensitive adhesive component such as a natural rubber, a synthetic rubber, a styrene block copolymer, a polyvinyl ether, an acrylate, a poly-α-olefin, a silicone, and mixtures thereof; and a tackifier component, as described above.

Method for Making an Adhesive Article

One embodiment of an adhesive article in accordance with the present invention is provided by a process described in International Publication No. WO 93/07228 (Herridge et al.). Typically, a suitable method includes an extrusion method comprising melt-processing at least one molten stream of pressure-sensitive adhesive composition and depositing the stream onto one major surface of a preformed backing, and cooling the stream to form the adhesive article. The molten stream may be melt processed and deposed on a major surface of the backing without passing the molten composition through a nip. Thus, one surface of the adhesive composition contacts the backing while the other is free, i.e., it does not contact another solid surface. In this embodiment of the invention, the adhesion problems due to nipping the molten composition are avoided. In another embodiment, the free surface of the adhesive composition may then be contacted with a release liner.

Alternatively, a coextrusion process may be used where more than one molten stream of pressure-sensitive adhesive composition is joined or unitized with a backing. This backing is formed from one of the streams. The end product of the coextrusion process may be a PSA-backing or a PSA-backing-PSA construction. A release liner can be applied to any of the PSA surfaces which are not adhered to a backing.

Advantageously, the backing may be supplied in a sheet-like or film form or it may be simultaneously melt processed with the adhesive composition during manufacturing of an adhesive article. In the latter instance, the backing is not limited to any particular thickness, and can be one micrometer or less, if desired.

As used herein, "melt processing" means the pumping and shaping of molten adhesive composition into an adhesive article. One melt processing technique useful in this invention is coextrusion. As used herein, "coextrusion" means the simultaneous melt processing of multiple molten streams and combination of such molten streams into a single unified extrudate, preferably from a single extrusion die. When a single die is used, the streams of molten material are not required to exit the die from a single outlet. The molten streams can be joined together in a feedblock, in the die, or outside the die. If the streams are joined in the die, they can come together upstream of the exit orifice (a common land die) or at the exit orifice (a zero common land die). In all cases, however, the streams are joined or combined together in proximity to the outlet of the die.

As mentioned above, an adhesive article in accordance with the invention may be manufactured using a coextrusion process, wherein several molten streams are transported to an extrusion die outlet and joined together in proximity of the outlet. One preferred coextrusion technique useful in the present invention is schematically shown in FIG. 1. Extruders 100 and 110 provide molten streams 102 and 112 of a first and a second pressure-sensitive adhesive composition to feedblock 130. Extruder 120 provides a molten stream of a third material, such as a backing material 122, to feedblock 130. It is of course understood that if no third material is desired, there is no need to utilize extruder 120. It is further understood that only one extruder, either 100 or 110, may be needed to deliver a pressure-sensitive adhesive composition to the feedblock 130. In the event that only one extruder is employed, the melt stream may be split into the number of stream (e.g., two or more) of a pressure-sensitive adhesive to be utilized in an adhesive article.

Feedblock 130 combines the molten streams into a single flow channel. The distinct layers of each material are maintained at this time generally because of laminar flow characteristics of the streams. The feedblock delivers or transports the now unified, molten extrudate to the extrusion die 140 where it is reduced in height and increased in width so as to provide a relatively thin and wide construction.

The extruders 100, 110, and 120 are in effect "pumps" for delivery of the molten streams to the extrusion die. The precise extruder employed is not critical to the process. However, it is understood that the design of the extruder screw will influence the ability of the extruder to provide good melt quality, temperature uniformity, throughput and the like. A number of useful extruders are known and include single and twin screw extruders, batch-off extruders and the like. These extruders are available from a variety of vendors including Davis-Standard Extruders, Inc. (Pawcatuck, C0nn.), Black Clawson Co. (Fulton, N.Y.), Berstorff Corp. (N.C.), Farrel Corp. (Conn.), Moriyama Mfg. Works, Ltd. (Osaka, Japan).

For example, in order to prepare a morphologically stable blend of SIS and SEBS, the preparation of the pressure-sensitive adhesive flow(s) involves the use of continuous blending and extrusion and coextrusion methods (extrusion techniques). Due to the relatively high melt viscosity of the SIS and SEBS components as compared to the final pressure-sensitive adhesive material, the SIS and SEBS are blended, modified with tackifying agents and plasticizers, then coated using extrusion techniques. Blending can be done by any method that results in a substantially homogeneous distribution of the SIS and SEBS. The SIS and SEBS are typically co-fed into the feedthroat of a twin screw extruder (TSE) having a combination of dispersive and distributive mixing actions. Other continuous compounding methods include single screw extruding, disk extruding, reciprocating single screw extruding, and pin barrel extruding. The continuous methods can include both distributive elements such as cavity transfer elements such as CTM, available from RAPRA Technology, Ltd., Shrewsbury, England, pin mixing elements, and static mixing elements and dispersive elements such as Maddock mixing elements or Saxton mixing elements.

After the SEBS and SIS components are dispersed in the TSE, the various adjuvants including molten tackifier or liquid plasticizer are pumped into the extruder at a later time down the barrel. The tackifier may also be fed as a solid flake into an open port of the TSE by means of volumetric or gravimetric feeding devices.

After the blended composition is pumped out of the continuous compounding device, the softened or molten PSA flow is extruded through the multilayer feedblock and single orifice die to form coatings which have a morphology such that domains of SEBS and SIS are elongated in the direction of flow (typically the machine or web direction) and have striation thickness that is less than 1 $\mu$m, preferably less than 0.5 $\mu$m.

Other equipment may also be employed to deliver the molten streams to the extrusion die. They include drum unloaders, bulk meters, gear pumps, etc. These are available from a variety of vendors, including Graco LTI (Monterey, Calif.), Nordson (Westlake, Calif.), Industrial Machine Manufacturing (Richmond, Va.), Zenith Pumps, Div., Parker Hannifin Corp. (N.C.).

Once the molten streams have exited the pump, they are typically transported to the die through transfer tubing and/or hoses. It is preferable to minimize the amount of residence time in the tubing so as to avoid problems, such as melt temperature variations. Limiting the residence time can be accomplished by a variety of techniques, such as limiting the length of tubing, providing appropriate temperature control of the tubing, and utilizing static mixers in the tubing to maintain a homogeneous temperature in the tubing.

The use of a feedblock is optional as a variety of coextrusion die systems are known. Thus, for example, a mulit-manifold die may also be employed. Examples of feedblocks and extrusion dies useful in the invention are available from The Cloeren Company (Orange, Tex.); Extrusion Dies, Inc. (Chippewa Falls, Wis.); ER-WE-PA (Ga.); Egan Machinery Division, John Brown Inc. (N.J.); and Welex Inc. (Pa.).

The selection of the feedblock and/or extrusion die to be utilized is not critical to the practice of the process. However, it is noted that certain factors do influence the performance of the extrusion process. For example, because feedblocks require material to flow in contact through a single manifold after the point of confluence, the relative viscosities of the materials are their ability to be processed at a single manifold temperature must be considered. When the relative viscosities of the materials exceed 4:1 or when a single manifold temperature cannot be tolerated by the materials, multimanifold dies are typically employed. In multimanifold dies, each material flows into its own manifold to the point of confluence. Each individual manifold can be designed specifically for the rheology of each resin. Also, each manifold can be controlled at a different process temperature.

Multimanifold dies can also be designed with zero common land length so that the materials do not meet until the die lip or exit orifice that are particularly useful when the molten streams each have extreme viscosity differences (e.g., a ratio of about 400:1 or more). Alternatively, they can be designed with a short common land length that are particularly useful for streams having more moderate viscosity differences because the period of high pressure and high temperature when the molten streams are together in the common land length can improve bond strength between layers formed by the molten streams in an adhesive article.

The extrusion die 140 deposits a unified, molten extrudate onto a solid substrate 150 supplied from a roll 151 so that a first surface of the extrudate is in contact with the a surface of the substrate 150 and a second surface of the extrudate is a free surface (i.e., it is not in contact with any other solid surface). Substrate 150 can be in the form of a release liner. The substrate 150 contacts the surface of a casting wheel 160 and is interposed between the surface of the casting wheel 160 and the molten stream. However, the use of the substrate 150 is optional. If the substrate 150 is not used, then the molten extrudate can be deposited directly on the surface of the casting wheel 160. The substrate 150 can then be applied to one surface of the resulting adhesive article later in the process, for example at a nip roll 170.

The casting wheel 160 is typically maintained at a temperature less than the temperature of the unified molten extrudate. Typically, this is a temperature of about 5° C. to about 150° C., preferably about 30° C. to about 105° C.

An air knife 165 may be used to force the molten unified extrudate against the substrate 150, if desired. Additionally, the unified extrudate can then be "nipped" between the casting wheel 160 and a nip roll 170. The unified extrudate can then pass through a series of rolls 171, 172, 173 and then can be wound as a roll 180. Desired widths and/or lengths of the adhesive article can be cut using conventional techniques.

A number of additional steps can optionally be performed if desired. For example, the adhesive article may be uniaxially or biaxially oriented, it can be post cured (such as through heat, electomagnetic radiation, etc.), or it can be dusted with various tack-reducing agents. Furthermore, low adhesion backsize (LAB) coatings can also be applied at this point.

An adhesive article in accordance with the present invention can be provided in several embodiments. For example, it can comprise two layers of a pressure-sensitive adhesive, as described above. Such an embodiment is shown in FIG. 2A, wherein reference numeral 10 indicates an adhesive article as a whole, and reference numerals 12 and 14 represent a first and a second exposed adhesive surfaces of first and second layers of pressure-sensitive adhesives 16 and 18, respectively.

FIG. 2B represents another embodiment of the invention in which an adhesive article 20 includes layers of pressure-sensitive adhesive 16 and 18 separated by a backing (or carrier layer) 19.

FIG. 2C represents an embodiment of the invention in which an adhesive article 30 includes a backing 19, layers 15 or 17 or a second pressure-sensitive adhesive and layers 16 and 18 of the first pressure-sensitive adhesive.

FIG. 2D illustrates an embodiment of the invention in which an adhesive article 40 has intermediate layers 11 and 13 that are each interposed between backing 19 and pressure-sensitive adhesive 16 and between backing 19 and pressure-sensitive adhesive 18, respectively.

FIG. 2E illustrates another embodiment of the invention in which a discontinuous material is provided as the backing. In this embodiment, adhesive article 50 includes a series of longitudinally disposed ribs or strands 51 surrounded by simultaneously extruded pressure-sensitive adhesive layers 16 and 18.

In each of these embodiments, the various layers are preferably simultaneously melt processed, as described above. Additionally, in each embodiment, it is to be understood that the pressure-sensitive adhesive utilized may the same or different than the others. In all of the embodiments shown in FIGS. 2A–2E, the use of a common pressure-sensitive adhesive for the adhesive layers results in an adhesive article having essentially the same tack and adhesion properties on both surface 12 and 14. However, if an adhesive article which has differential tack and/or adhesion is desired, different pressure-sensitive adhesive compositions may be employed for each of surfaces 12 and 14.

Figure 3:
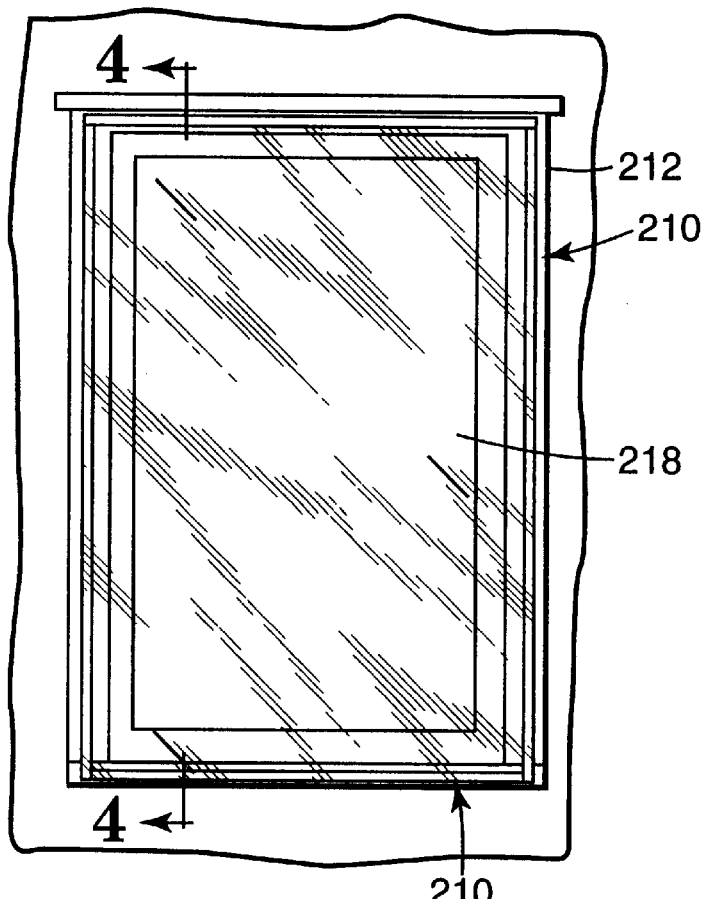
FIG. 3 is a plan view of a window and window frame wherein a plastic film is adhered to the exterior of the window by use of an adhesive article in accordance with the invention.
Figure 4:
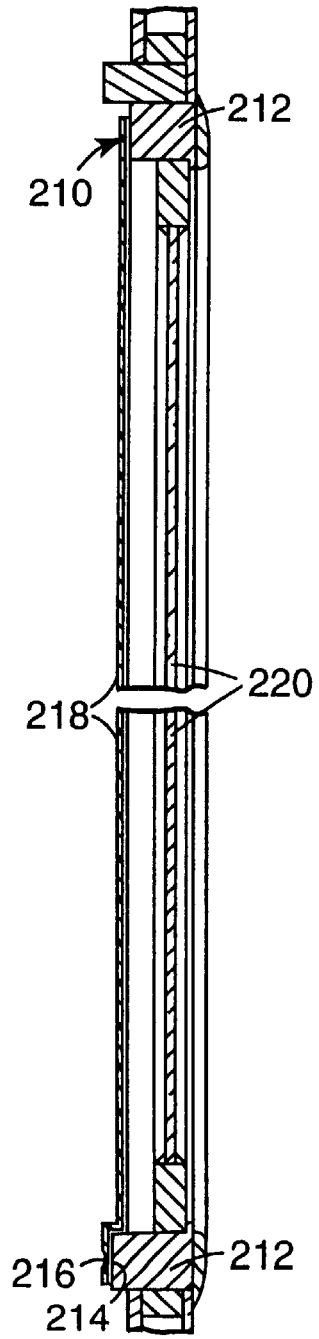
FIG. 4 is a cross-sectional view of the window and window frame of FIG. 1 taken along line 4—4.

An adhesive article having a pressure-sensitive adhesive on both major surfaces, as described above, are particularly useful to affix a sheet of polymeric film to a window frame to provide insulation. FIGS. 3 and 4 illustrate an outdoor application of a sheet of polymeric film affixed to an outer portion of a window frame. Preferably, the adhesive article is in the form of a tape 210. The tape 210 is unwound from a roll (not shown) and is affixed to an outer portion of window frame 212 with an adhesive surface 214, shown in FIG. 4. A release liner (not shown) is removed from the adhesive surface 216 of tape 210, thus exposing an adhesive surface for attachment to a polymeric film 218. The polymer film 218 is affixed to window frame 212 with the adhesive surface 216 so that there is a gap between the film 218 and the window pane 220. Although shown with respect to providing insulation to a window from the outside, it is to be understood that a window can be insulated from the inside, i.e., the film is applied to the inside portion of the window frame with a double-sided adhesive article in accordance with the invention. Advantageously, an adhesive article in accordance with the invention includes a pressure-sensitive adhesive having suitable adhesion, cohesion and UV resistance so that it is adaptable to environmental conditions both indoors and outdoors.

Within the first few minutes after application, the polymeric film can be removed and repositioned without adhesive transfer or film distortion. Within an hour, however, adhesion has increased significantly. The film can be trimmed, as with scissors or a razor blade, so that the excess film material will not extend beyond the edge of the tape.

For windows, prefabricated film with double-sided pressure-sensitive tape adhered thereto can be used. The tape should have a protective liner on the surface of the tape away from the polymeric film to prevent the tape from adhering to itself prior to use. The protective liner would be removed before the polymeric film is installed on the window frame. Wrinkles in the film can be removed by subjecting the film to tension, if it is stretchable, or to heat, as with a heat gun or hair dryer, if it is heat-shrinkable. While initial adhesion between the film and the tape is relatively low, it builds to a stronger bond within a brief time thus, allowing for film repositioning.

Insulation Kit

A kit for insulation in accordance with the present invention comprises a tape and a polymeric film. The tape comprises a backing having a first and second major surface, i.e., two opposing major surfaces, the tape having a pressure-sensitive adhesive on both sides. The backing can be formed from a polymer comprising polypropylene, polyamide, polyester, for example, polyethylene terephthalate, and mixtures thereof. The pressure-sensitive adhesive preferably is an adhesive composition that includes a styrene block copolymer blend comprising styrene-isoprene-styrene and styrene-(ethylene-butylene)-styrene; and a tackifier component including a hydrogenated hydrocarbon resin. The adhesive composition exhibits ultraviolet radiation resistance and has a midpoint glass transition temperature of about −5° C. to about −30° C. at a frequency of about 1.0 Hz.

The polymeric film is of the type used to insulate windows, for example, a stretchable film, shrinkable film, or stretchable/shrinkable film. Preferred materials for the polymeric film are polyolefins such as polyethylene, polypropylene, and ethylene propylene copolymers. The film preferably has a thickness ranging from about 0.01 to about 0.07 mm. The preferred film is a 0.02 mm radiation-crosslinked polyethylene. The film can be transparent or tinted to reduce sunlight and glare. It is also preferred that the film be shrinkable, by heat, or stretchable, by tension, so that wrinkles in the film can be removed after installation. If the film is shrinkable, it is preferred that the shrinkage be between about 1 and about 10% in both directions at 70° C. as measured in accordance with ASTM-D-2732 (1976). If the film is stretchable, it is preferred that the film have a bulk modulus of between about 8000 and about 120,000 pounds/inch$^2$ (psi) and an elongation of about 75 to about 600% as measured in accordance with ASTM-D-882 (1981). Furthermore, it is preferred that the film be capable of withstanding temperatures of from about −30° C. to about 65° C. and have a transparency greater than about 85% as measured in accordance with ASTM-D-1003 (1977). A representative example of a film suitable for window insulation purposes is available from W. R. Grace & Co. and has the trade designation "RD-103"; this film is a heat-shrinkable and/or stretchable radiation crosslinked biaxially oriented blown polyethylene/ethylene vinyl acetate copolymer film.

EXAMPLES

The objects, features and advantages of the present invention illustrated in the following examples, which incorporate particular materials and amounts, should not be construed to unduly limit this invention. All materials are commercially available or known to those skilled in the art unless otherwise stated or apparent. In particular, the styrene-isoprene-styrene (SIS) used is available under the trade designation "KRATON D1107" and the styrene-(ethylene-butylene)- styrene (SEBS) used in available under the trade designation "KRATON G1657," both available from Shell Chemical Co. One tackifier used was a $C_5$ aliphatic olefin-derived resin, available under the trade designation of "ESCOREZ 1310LC," from Goodyear. Another tackifier used was a hydrogenated hydrocarbon resin, available under the trade designation "REGALREZ 1094," from Hercules Inc. All parts, percentages, ratios, etc., in the examples are by weight unless otherwise indicated.

Comparative Examples A–C

Comparative Examples A–C, formulated as shown in Table 1, were prepared by melt blending SIS and SEBS on a Werner-Phleiderer Model ZSK-30 co-rotating twin-screw extruder. The SIS and SEBS were co-fed into the feed throat (zone 1) of the twin-screw extruder operating at 177° C. The resin was melted at 148° C. and one-third of the flow was pumped into zone 3, while two-thirds of the flow as pumped into zone 5. The extruder was discharged into a 15.25 cm wide single orifice die using a ZENITH gear pump. All temperatures were maintained at 177° C. The output of the die was extruded between a release-coated paper and a 51 micrometers thick polyethylene terephthalate (PET) film at web speeds of 0.005–0.015 meters/second. The resulting adhesive compositions were extruded through a single orifice die and coated onto a 51 micrometers thick PET film (available under the trade designation "MELINEX" from Dupont).

TABLE 1

| Example | SIS (weight %) | SEBS (weight %) | $C_5$ aliphatic tackifier (weight %) |
|---|---|---|---|
| Comp. A | 46.9 | 6.25 | 46.9 |
| Comp. B | 42.4 | 15.1 | 42.4 |
| Comp. C | 34.9 | 30.2 | 34.9 |

Figure 5:
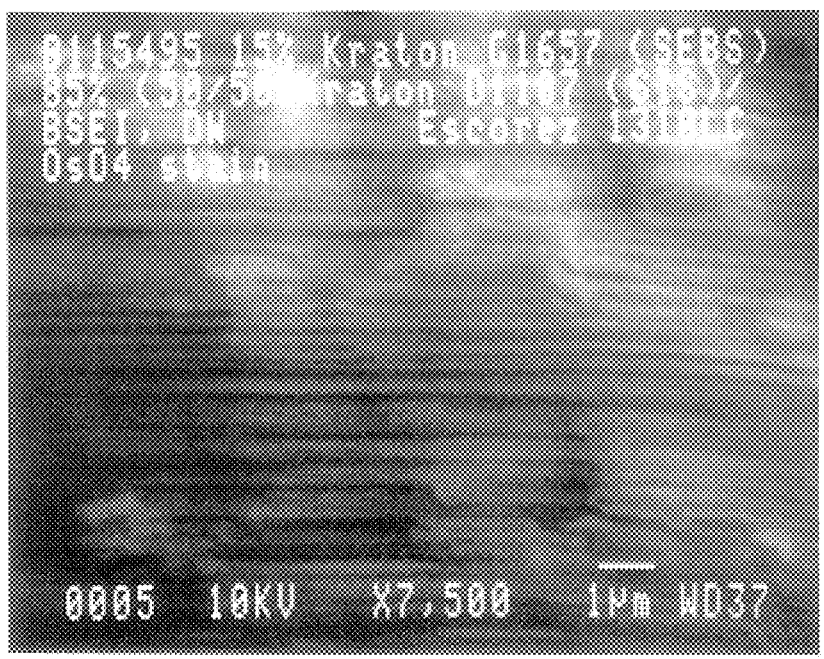
FIG. 5 is a scanning electron microscope (SEM) photomicrograph of a melt processed adhesive blend of SIS and SEBS taken in a machine-direction cross-section at a magnification of 7500×.
Figure 6:
FIG. 6 is an SEM photomicrograph of a melt processed adhesive blend of SIS and SEBS taken in a cross-web direction cross-section at a magnification of 7500×.

While Comparative Examples A–C only utilized a $C_5$ aliphatic tackifying resin, they demonstrate the immiscible nature of the SIS and SEBS, as seen in FIGS. 5 (a machine-direction cross-section, magnification of 7500×) and 6 (a cross-web direction cross-section, magnification of 7500×), which are SEM photomicrographs of Comparative Example B.

In the SEM photomicrographs, the isoprene midblocks were stained with osmium tetroxide and appear light due to the image being obtained in reflection from a cut face. The dark SEBS domains are well dispersed in a continuous SIS matrix as fibers/sheets with diameters of less than 0.2 $\mu$m. While this blend is still considered immiscible, the fine dispersion is probably due to the presence of common styrene end-blocks for the two block copolymers. It is believed that the high shear cohesive strength obtained with the compositions of the invention are due to the reinforcement of the modified SIS matrix by SEBS fibrils. The high shear dispersion forces present in the twin-screw extruder during melt blending and subsequent processing are most likely responsible for this difference in morphology. Conversely, solvent blends of the same components generally have larger spherical domains and can be imaged with an optical microscope at 2040× magnification.

Examples 1–15 and Comparative Examples D–T

A solvent mixture study was conducted to assess the adhesion to window film, shear cohesive strength, midblock $T_g$, and UV resistance of various compositions. The materials were blended in toluene heptane at 20% solids and coated onto 51 micrometer thick PET backing to achieve a 44 grams/m² coating weight, which is approximately 38.1 micrometers thick. Table 2 fists the formulations for Examples 1–15, which included SIS, SEBS, $C_5$ tackifier, hydrogenated hydrocarbon resin and a mineral oil plasticizer. Comparative Examples D–T are also shown in Table 2 and are paired with the respective comparable formulations of Examples 1–15 but Comparative Examples D–T do not contain a hydrogenated hydrocarbon resin.

Each of the Examples and Comparative Examples were evaluated with the following tests. Table 2 also shows the results of these test.

Window Film Adhesion Test

Adhesion to both glass and window film were measured at a 0.005 m/s. peel rate after 24 hours in a room operating at 22° C. and 40–50% relative humidity.

The equipment used included an I-MASS Peel Machine #SP-102B-3M90, a black painted (back side) float glass plate, attachment clamp with stirrup and load cell clamp, a 0.013×25.4 mm polyester film and a 12.7 mm sample cutter.

An adhesive article specimen to be tested was cut approximately 406 mm×12.7 mm from each example to be tested. At the beginning of every test session and whenever a change in adhesive type occurs, the following glass plate cleaning procedure was utilized: One (1) wash with diacetone alcohol and wipe dry with tissue available under the trade designation "KLEENEX" brand tissue. Three (3) washes with heptane and wipe dry with "KLEENEX" brand tissue between each wash.

When testing an adhesive article surface against a non-printed side of a release liner Procedure A was utilized, and included the following steps:

(1) The release liner was removed from the adhesive article example to be tested and one end of the tape sample was touched to the left end of the glass plate. The other end of the tape sample was lowered and lightly attached to the glass plate. If testing an inside window insulation kit tape roll, cover second strip of adhesive with 0.013 mm polyester film. Care was taken so that the tape or polyester film was not wrinkled.

(2) A 2.0 kg roller, commercially available from Chemsultants International, Mentor Ohio, model number HR100, was held on the left end of the sample without applying pressure.

(3) The platen drive was started and rolled the length of the platen travel (one pass).

(4) The roller was raised and the platen was returned to the start position.

(5) The left end of the tape was attached to the stirrup and nearly all of the slack was removed from the tape by adjusting the platen.

(6) The platen drive was started. After the platen has stopped, the Meter Select Switch was turned to "Average" and the value displayed was recorded.

When testing an adhesive article's exposed adhesive side against the printed side of the release liner, Procedure B was utilized and included the following steps:

(1) One end of the tape sample was touched to the left end of the glass plate. The other end of the sample was lowered and lightly attached to the glass plate. The release liner was removed.

(2) A 0.013 mm polyester film was laid on top of sample without applying pressure.

(3) The 2.0 kg roller was held on the left end of the sample without applying pressure.

(4) The platen drive was started and rolled the length of the platen.
(5) The roller was raised and the platen was returned to the start position.
(6) The left end of the tape was attached to the stirrup and nearly all of the slack in the tape was removed by adjusting the platen.
(7) The platen drive was started. After the platen has stopped, the Meter Select Switch was turned to "Average" and the value displayed was recorded.

Shear Cohesive Strength Test

A 1000 gram drop shear test was performed against a steel plate using a 12.7 mm×12.7 mm sample size in a controlled temperature/humidity area having a temperature of 23±2° C. and a relative humidity of 50±2%. Equipment used included a Shear stand Model AST-6 with 2° backward tilt at top of shear panel; shear panels, 76 mm×76 mm×0.155 mm, #4 polished—#304 stainless steel, available from C-Tek Limited Partnership (Minneapolis, Minn.); a 2.0 kg hand roller, commercially available from Chemsultants International, Mentor Ohio, model number HR100; for double coated tape, a 12.4 mm wide roll of 0.012 mm polyester film; a kilogram weight (unless otherwise specified); and adapter hooks (brass tape hangers) with marked centers.

To test the face side of double-sided adhesive articles, the following procedure was utilized. A specimen having the dimensions of 152 mm long×12.7 mm of each example was tested and, without delay, one end of the tape specimen was tabbed to a covered auxiliary plate available under the trade designation "TEFLON" while the other end of the tape specimen was held over the test panel. Light finger pressure was used so that adhesive touched and adhered to the panel. The release liner was removed from the specimen. A 25.4 mm wide, 0.012 mm thick polyester film was placed over the specimen. A 2.0 kg roller, commercially available from Chemsultants International, Mentor Ohio, model number HR100, was rolled from the auxiliary panel across the test panel and back. This was repeated so as to provide two passes in each direction (the specimen is rolled down a total of four times). The rolling strokes were limited so that all passes were completed in six to eight seconds. The auxiliary panel was removed from the tape ends by drawing assembly to edge of table and pressing downward on the auxiliary panel. The tape ends were folded over the marked center of the adapter hook, making certain that ends are folded back squarely and that doubled portions are at least 25.4 mm long. The folded end did not touch the test panel. The folded ends were stapled twice. The tape on the test panel was trimmed to exactly 12.7 mm using the razor cut-off block. The test panel was transferred to the shear stand, keeping the side having the specimen facing upward. A kilogram weight was immediately attached to the adapter hook, ensuring that no swinging or twisting occurred because this typically results in premature sample failure. The hook uniformly pulled down on the tape being tested. Timers were started and the test was run to completion, unless otherwise noted.

To test the face side shear on double-sided adhesive articles, the following procedure was used. A 152 mm long×12.7 mm wide specimen was taken from each example to be tested and the release liner was removed. The backside (side where the liner was attached) was attached to the test panel and auxiliary panel using light finger pressure at the ends of the sample, taking care such that the tape specimen was not wrinkled. Steps 4–10 from above were repeated.

In each test procedure used, the shear value in minutes or seconds were recorded. If no adhesive remained on the test panel, a pop-off (P.O.) was indicated, indicating a firm adhesive. Splits indicated that some of the adhesive remained on the test panel, indicating a soft adhesive. The following chart was used to report the % adhesive remaining on the test panel. If the % transfer fell in the range designated by column A, then the value represented in column B was reported.

| A: % Transfer | B: Reported Value |
|---|---|
| 0–4 | 0% |
| 5–35 | 25% |
| 36–66 | 50% |
| 67–95 | 75% |
| 96–100 | 100% |

Dyamic Mechanical Anlsis (DMA)

Midblock $T_g$ was assessed by dynamic mechanical analysis. A 2 mm thick adhesive sample was placed between two 8 mm diameter parallel plates of a Rheometrics RDA II DMA operating in steady-shear mode at a frequency of 1 Hz and 1% strain. The temperature was scanned from 25° C. to −50° C. at a rate of 2° C. per minute. The values of storage modulus (G') and loss modulus (G") and the loss factor (tangent delta), i.e., the tangent of G"/G', were measured. The glass transition temperature peak, i.e., the maximum of the peak of the tangent delta response, which is also known as the midblock glass transition temperature, was reported as the midblock $T_g$.

UV Resistance Test

UV stability was assessed after exposure of the adhesive coated tape that had been adhered to a polyolefin window film (commercially available from Minnesota Mining and Manufacturing Company (3M), St. Paul, Minn.) for 7 days to a xenon arc lamp in accordance with ASTM Test Method designated G26. After exposure through the window film onto the PSA coating over the prescribed time period, the PSA tapes were pulled off of the window film and inspected for any residual thumb tack. In Table 2, a "+" means that some tack was observed, while a "−" means that the coating had no tack and was hardened by the UV exposure and, thus, the adhesive article was considered to be unacceptable. It should be noted that this weathering test is quite severe and may overemphasize the UV photo-effects since wavelengths of light less than 300 nm were present. These wavelengths are not as prevalent in an outdoor environment.

TABLE 2

| Example | SIS (weight %) | SEBS (weight %) | $C_5$ tackifier (weight %) | hydrogenated tackifier (weight %) | Plasticizer (weight %) | Adhesion to glass (N/dm) | Adhesion to window film (N/dm) | 1000 gm drop shear (min) | $T_g$ Peak value (° C.) | UV Resistance (+, −) |
|---|---|---|---|---|---|---|---|---|---|---|
| Comparative Example D | 45 | 15 | 35 | 0 | 5 | 46.8 | 11.7 | 10000+ | −24.4 | − |
| 1 | 45 | 15 | 17.5 | 17.5 | 5 | 43.3 | 7.3 | 10000+ | −24.5 | + |

TABLE 2-continued

| Example | SIS (weight %) | SEBS (weight %) | C₅ tackifier (weight %) | hydrogenated tackifier (weight %) | Plasticizer (weight %) | Adhesion to glass (N/dm) | Adhesion to window film (N/dm) | 1000 gm drop shear (min) | $T_g$ Peak value (° C.) | UV Resistance (+, −) |
|---|---|---|---|---|---|---|---|---|---|---|
| Comparative Example E | 45 | 15 | 30 | 0 | 10 | 33.2 | 6.3 | 10000+ | −31.4 | − |
| 2 | 45 | 15 | 15 | 15 | 10 | 34.7 | 5.2 | 10000+ | −28.4 | + |
| Comparative Example F | 40 | 20 | 35 | 0 | 5 | 48.9 | 16.4 | 10000+ | −25.4 | − |
| 3 | 40 | 20 | 17.5 | 17.5 | 5 | 46.1 | 7.1 | 10000+ | −23.4 | + |
| Comparative Example G | 40 | 20 | 30 | 0 | 10 | 38.1 | 5.9 | 10000+ | −30.4 | − |
| 4 | 40 | 20 | 15 | 15 | 10 | 32.5 | 5.5 | 10000+ | −29.4 | + |
| Comparative Example H | 35 | 25 | 35 | 0 | 5 | 45.0 | 12.8 | 10000+ | −24.4 | − |
| 5 | 35 | 25 | 17.5 | 17.5 | 5 | 43.2 | 5.1 | 10000+ | −24.5 | + |
| Comparative Example I | 35 | 25 | 30 | 0 | 10 | 31.3 | 5.0 | 10000+ | −31.4 | − |
| 6 | 35 | 25 | 15 | 15 | 10 | 27.0 | 8.8 | — | −28.4 | + |
| Comparative Example J | 30 | 30 | 35 | 0 | 5 | 43.7 | 6.7 | — | −19.5 | − |
| 7 | 30 | 30 | 17.5 | 17.5 | 5 | 43.0 | 5.0 | 10000+ | −26.4 | + |
| Comparative Example K | 30 | 30 | 30 | 0 | 10 | 32.5 | 5.2 | 10000+ | −23.5 | − |
| 8 | 30 | 30 | 15 | 15 | 10 | 29.1 | 4.7 | 10000+ | −22.5 | + |
| Comparative Example L | 40 | 10 | 45 | 0 | 5 | 54.8 | 11.8 | — | −11.4 | − |
| 9 | 40 | 10 | 22.5 | 22.5 | 5 | 62.8 | 11.3 | — | −11.5 | + |
| Comparative Example M | 40 | 10 | 40 | 0 | 10 | 68.1 | 9.5 | 10000+ | −20.4 | − |
| 10 | 40 | 10 | 20 | 20 | 10 | 48.5 | 8.7 | — | −18.5 | + |
| Comparative Example N | 35 | 15 | 45 | 0 | 5 | 55.7 | 12.2 | — | −12.5 | − |
| 11 | 35 | 15 | 22.5 | 22.5 | 5 | 62.0 | 11.6 | 10000+ | −9.43 | + |
| Comparative Example O | 35 | 15 | 40 | 0 | 10 | 51.8 | 10.8 | — | −18.4 | − |
| 12 | 35 | 15 | 20 | 20 | 10 | 45.7 | 9.9 | — | −18.4 | + |
| Comparative Example P | 30 | 20 | 45 | 0 | 5 | 61.8 | 11.7 | 10000+ | −14.5 | − |
| 13 | 30 | 20 | 22.5 | 22.5 | 5 | 55.2 | 11.2 | — | −10.5 | + |
| Comparative Example Q | 30 | 20 | 40 | 0 | 10 | 39.6 | 7.6 | — | −21.4 | − |
| Comparative Example R | 30 | 20 | 20 | 20 | 10 | 22.3 | 3.5 | 10000+ | −39.2 | + |
| Comparative Example S | 25 | 25 | 45 | 0 | 5 | 55.5 | 9.7 | 10000+ | −8.59 | − |
| 14 | 25 | 25 | 22.5 | 22.5 | 5 | 55.6 | 15.5 | — | −6.50 | + |
| Comparative Example T | 25 | 25 | 40 | 0 | 10 | 46.1 | 7.9 | — | −16.4 | − |
| 15 | 25 | 25 | 20 | 20 | 10 | 51.2 | 7.5 | — | −16.5 | + |

Figure 7A:
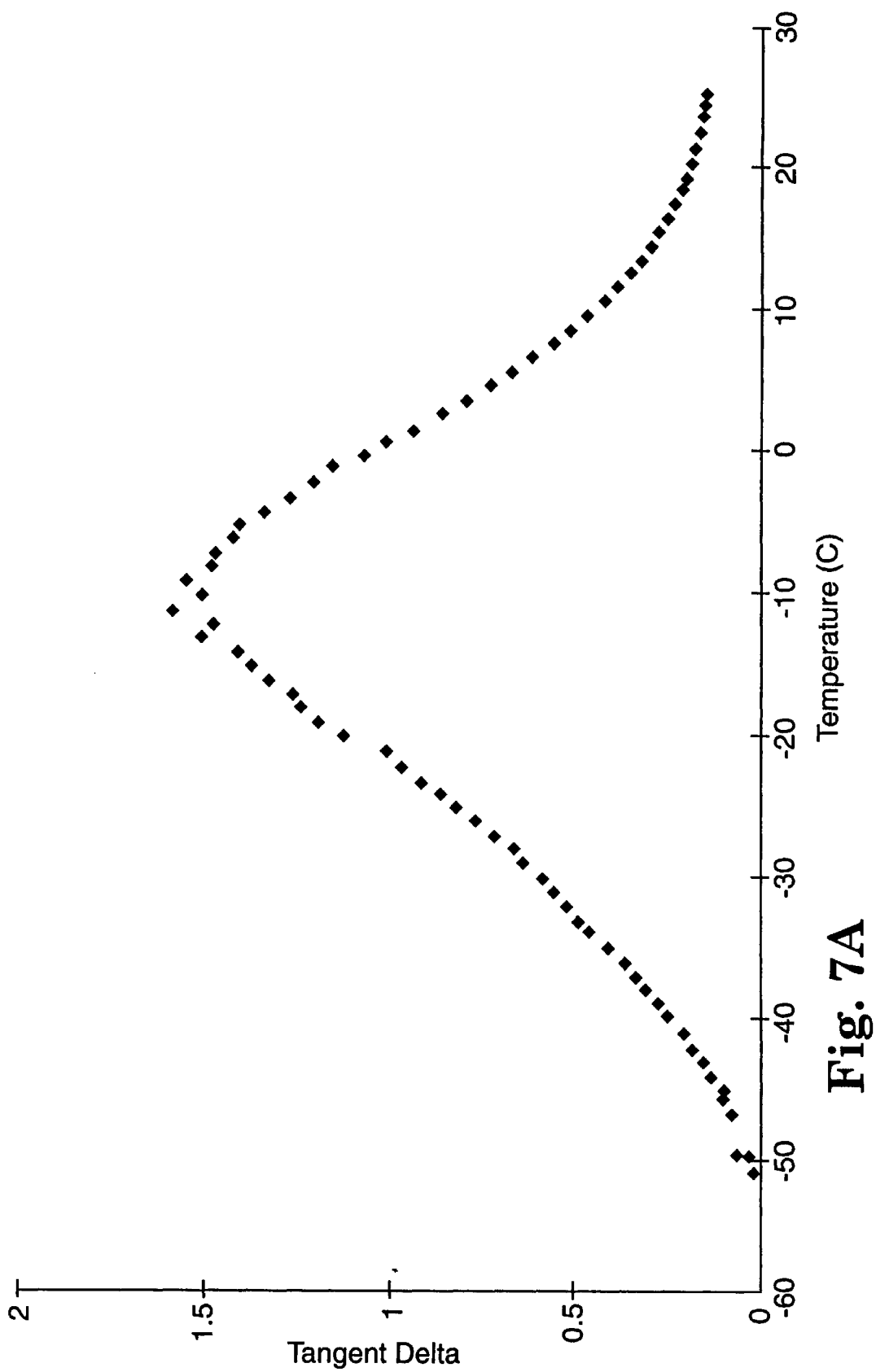
FIGS. 7A–7B are graphic representations of midblock glass transition temperature ($T_g$) determinations of pressure-sensitive adhesive compositions in accordance with the invention.
Figure 7B:
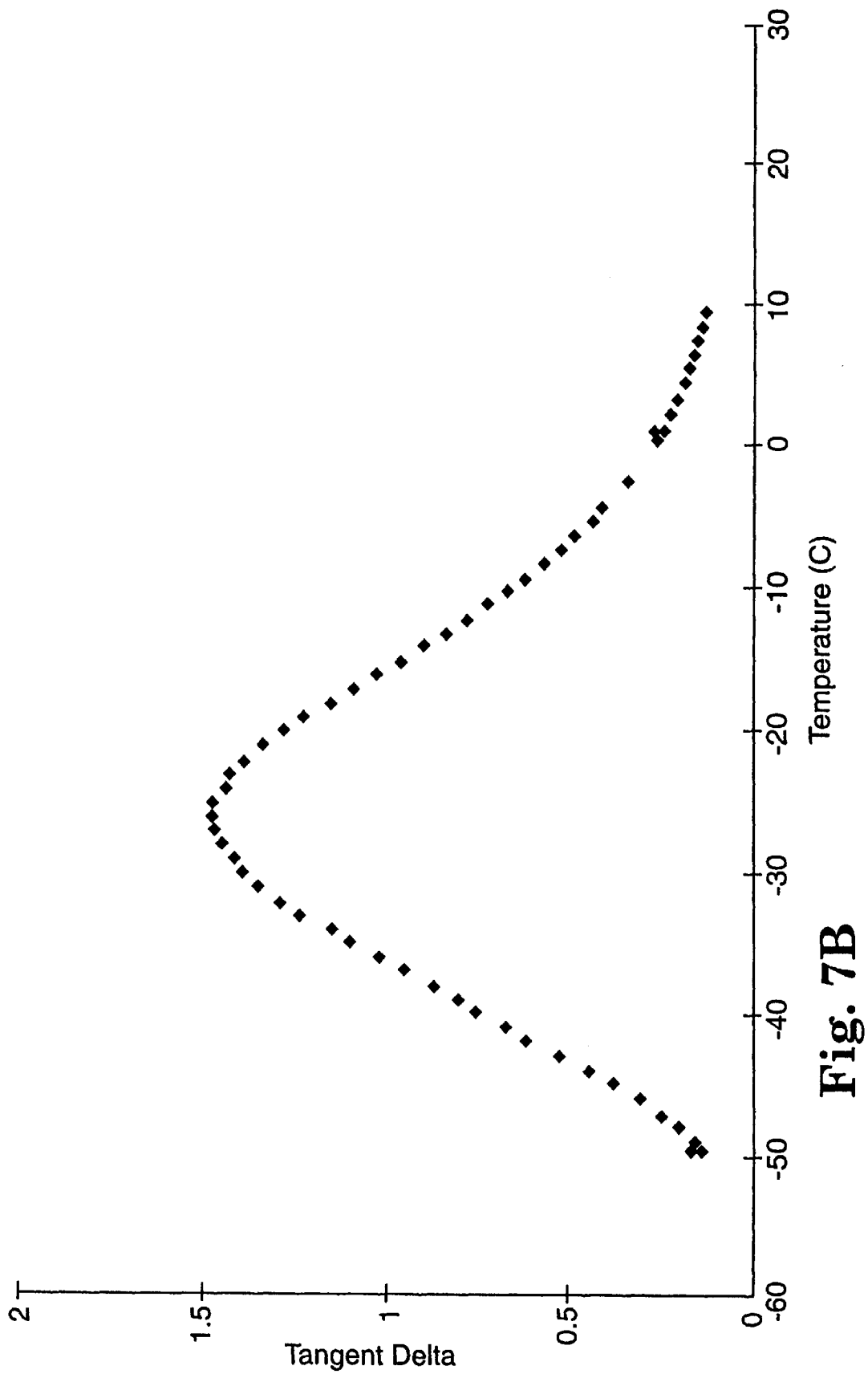

The Samples, as shown in Table 2, were well shaken before coating out of solvent. Even though CR had acceptable UV performance, the midblock $T_g$ was too low to attain reasonable adhesion levels to glass and window film. All samples exhibited a broad, single glass transition response as measured by DMA. It is believed that this may be due to the overlap of the resin/oil modified isoprene and ethylene-butylene midblock $T_g$ responses and is depicted in FIGS. 7A and 7B for Examples 7 and 13, respectively.

Examples 16–20

Table 3 summarizes the compositions in Examples 16–20. These compositions were blended in the same manner as in Comparative Examples A–C, except a model no. LSM34GL, 34 mm diameter co-rotating twin-screw extruder available from Leistritz, Inc., was used. An aliphatic C₅ tackifier (available under the trade designation "ESCOREZ 1310LC," available from Exxon) and a hydrogenated hydrocarbon resin (available under the trade designation "REGALREZ 1085," available from Hercules, Inc.) were melted at 148° C. and pumped into zone 5. The twin-screw extruder was discharged into the outer vanes of a Cloeren 3-layer feed-block via a gear pump available under the trade designation "ZENITH". A carrier layer of a polyamide resin commercially available under the trade designation "GRILON BSE" from EMS-American Grilon, was melted in a 3.17 cm diameter single-screw extruder (commercially available under the trade designation "KILLION" from Killion Extruders, Inc., Princeton, N.J.) operating at 154° C.–193° C. and pumped into the center vane of the feed-block which was maintained at 177° C. The feed-block was connected to a 25.4 cm wide single-orifice die which extruded the 3 layer film onto a nip formed release coated paper and a silicone rubber covered roll. The release coated paper was in contact with a steel back-up roll operating at 22.2° C. Each lot contained 1.5 parts per hundred rubber (phr) available under the trade designation "IRGANOX 1010" and 1.5 phr antioxidant available under the trade designation "CYANOX LDTP" UV stabilizer.

TABLE 3

| Example | SIS (weight %) | SEBS (weight %) | C₅ tackifier (weight %) | hydrogenated tackifier (weight %) | Plasticizer (weight %) | HERCOLITE RES 2404 (weight %) | Carrier Layer (thickness in mm) |
|---|---|---|---|---|---|---|---|
| 16 | 30 | 30 | 17.5 | 17.5 | 5 | 0 | 0.036 |
| 17 | 30 | 30 | 20 | 20 | 0 | 0 | 0.036 |
| 18 | 30 | 30 | 26 | 9 | 5 | 0 | 0.048 |
| 19 | 30 | 30 | 30 | 10 | 0 | 0 | 0.048 |
| 20 | 30 | 30 | 0 | 0 | 5 | 35 | 0.048 |

Table 4 summarizes the adhesive properties of Examples 16–20 described in Table 3 as compared to commercially available adhesive articles found in an indoor window insulation kit (Comparative Example U) and an outdoor window insulation kit (Comparative Example V) (both commercially available from 3M Company, St. Paul, Minn.).

TABLE 4

| Example | Adhesion to glass (N/dm) Face side | Adhesion to glass (N/dm) Liner side | Adhestion to window film (N/dm) | Shear Cohesive Strength (min) |
|---|---|---|---|---|
| Comparative Example U | 51.5 | 50.1 | 15.68 | 1000 + F |
| standard deviation | 1.77 | 1.58 | 0.20 | 9442 L |
| Comparative Example V | 20.1 | 33.3 | 8.43 | 313 F |
| standard deviation | 1.12 | 1.30 | 0.11 | 515 L |
| Example 16 | 39.5 | 33.8 | 9.36 | 10000 + F |
| standard deviation | 3.63 | 0.09 | 0.11 | 10000 + L |
| Example 17 | 43.7 | 45.6 | 10.47 | 10000 + F |
| standard deviation | 0.93 | 0.84 | 0.11 | 10000 + L |
| Example 18 | 36.0 | 38.0 | 8.98 | 10000 + F |
| standard deviation | 1.86 | 0.84 | 0.20 | 10000 + L |
| Example 19 | 42.8 | 44.3 | 9.99 | 10000 + F |
| standard deviation | 1.49 | 0.65 | 0.11 | 10000 + L |
| Example 20 | 43.3 | 39.1 | 8.98 | 10000 + F |
| standard deviation | 1.13 | 2.11 | 0.28 | 10000 + L |

The data in Table 4 shows that the hot melt blended samples have 2 times higher adhesion to the polyolefin window film than the comparable solvent sample (compare Example 16 at 9.3 N/dm to Example 7 at 4.7 N/dm).

The complete disclosure of all patents, patent applications, and publications are incorporated herein by reference as if individually incorporated. Various modifications and alterations of this invention will become apparent to those skilled in the art without departing from the scope of this invention, and it should be understood that this invention is not unduly limited to the illustrative embodiments set forth herein.

What is claimed is:

1. An adhesive article comprising:
   (a) a backing having a first major surface and a second major surface;
   (b) an adhesive composition on at least the first major surface of the substrate, wherein the adhesive composition comprises:
      (1) a styrene block copolymer blend comprising styrene-isoprene-styrene and styrene-(ethylene-butylene)-styrene; and
      (2) a tackifier component comprising a hydrogenated hydrocarbon resin,
   wherein the styrene block copolymer blend comprises styrene-isoprene-styrene and styrene-(ethylene-butylene)-styrene in a ratio of about 1 to about 3 parts styrene-isoprene-styrene to about 1 part styrene-(ethylene-butylene)-styrene.

2. The adhesive article of claim 1 wherein the adhesive composition is on the second major surface of the backing.

3. The adhesive article of claim 1 wherein the adhesive composition further comprises an optional additive.

4. The adhesive article of claim 1 wherein the adhesive composition further comprises a plasticizer.

5. The adhesive article of claim 1 wherein the adhesive composition comprises a total rubber fraction of about 50 weight percent to about 60 weight percent.

6. The adhesive article of claim 1 wherein the adhesive composition further comprises about 10 weight % or less of a plasticizer.

7. The adhesive article of claim 1 wherein the tackifier component further comprises a C₅ tackifier, wherein the hydrogenated hydrocarbon resin comprises about 30 weight percent to about 70 weight percent of the tackifier component.

8. The adhesive article of claim 1 further comprising another adhesive composition on the second major surface of the backing.

9. The adhesive article of claim 1 wherein the adhesive composition on the first surface and the adhesive composition on the second surface are the same.

10. The adhesive article of claim 1 wherein the backing comprises polypropylene, polyamide, polyester, and mixtures thereof.

11. The adhesive article of claim 1, wherein the polyester is polyethylene terephthalate.

12. The adhesive article of claim 1, wherein the adhesive composition further comprises a pressure-sensitive adhesive component comprising a natural rubber, a synthetic rubber, a styrene block copolymer, a polyvinyl ether, an acrylate, a poly-α-olefin, a silicone, or mixtures thereof.

13. An adhesive article having two surfaces formed from two simultaneously melt processed normally tacky pressure-sensitive adhesives, wherein at least one of the simultaneously melt processed normally tacky pressure-sensitive adhesives comprises:
   (a) a styrene block copolymer blend comprising styrene-isoprene-styrene and styrene-(ethylene-butylene)-styrene; and
   (b) a tackifier component comprising a hydrogenated hydrocarbon resin,
   wherein the styrene block copolymer blend comprises styrene-isoprene-styrene and styrene-(ethylene-butylene)-styrene in a ratio of about 1 to about 3 parts styrene-isoprene-styrene to about 1 part styrene-(ethylene-butylene)-styrene.

14. The adhesive article of claim 13 wherein the two simultaneously melt processed normally tacky pressure-sensitive adhesives are the same.

15. An adhesive composition comprising:
(a) a styrene block copolymer blend comprising styrene-isoprene-styrene and styrene-(ethylene-butylene)-styrene; and
(b) a tackifier component comprising a hydrogenated hydrocarbon resin,
wherein the styrene block copolymer blend comprises styrene-isoprene-styrene and styrene-(ethylene-butylene)-styrene in a ratio of about 1 to about 3 parts styrene-isoprene-styrene to about 1 part styrene-(ethylene-butylene)-styrene.

16. The adhesive composition of claim 15 further comprising further a $C_5$ tackifier, wherein the hydrogenated hydrocarbon resin comprises about 30 weight percent to about 70 weight percent of the tackifier component.

17. A kit for insulation comprising:
(a) a tape having a backing bearing a pressure-sensitive adhesive composition on two opposing major surfaces of the backing, wherein the pressure-sensitive adhesive composition comprises:
(b) a styrene block copolymer blend comprising styrene-isoprene-styrene and styrene-(ethylene-butylene)-styrene, wherein the styrene block copolymer blend comprises styrene-isoprene-styrene and styrene-(ethylene-butylene)-styrene in a ratio of about 1 to about 3 parts styrene-isoprene-styrene to about 1 part styrene-(ethylene-butylene)-styrene;
(c) a tackifier component comprising a hydrogenated hydrocarbon resin; and
(d) a polymeric film.

18. The kit of claim 17 wherein the polymeric film is shrinkable.

19. The kit of claim 17 wherein the polymeric film is stretchable.

20. The kit of claim 17 wherein the polymeric film is shrinkable and stretchable.

21. The kit of claim 17, wherein the pressure-sensitive adhesive composition further comprises an optional additive.

22. The kit of claim 17 wherein the pressure-sensitive adhesive composition further comprises a plasticizer.

23. The kit of claim 17 wherein the pressure-sensitive adhesive composition comprises a total rubber fraction of about 50 weight percent to about 60 weight percent.

24. The kit of claim 17 wherein the pressure-sensitive adhesive composition further comprises about 10 weight % or less of a plasticizer.

25. The kit of claim 17 wherein the tackifier component further comprises a $C_5$ tackifier, wherein the hydrogenated hydrocarbon resin comprises about 30 weight percent to about 70 weight percent of the tackifier component.

* * * * *

UNITED STATES PATENT AND TRADEMARK OFFICE
CERTIFICATE OF CORRECTION

PATENT NO. : 6,197,419 B1
DATED : March 6, 2001
INVENTOR(S) : Patrick D. Hyde, James L. White, Jon E. Stickrod, and Bryan C. Feisel It is certified that error appears in the above-identified patent and that said Letters Patent is hereby corrected as shown below:

Column 7,
Line 28, "usefuil" should read -- useful --.

Column 9,
Line 11, "C0nn." should read -- CT. --.

Column 13,
Line 63, "2040x" should read -- 20-40 --.

Column 14,
Line 2, "toluenelheptane" should read -- toluene/heptane --.
Line 5, "fists" should read -- lists --.

Column 20,
Line 40, "claim 1" should read -- claim 8 --.
Line 46, "claim 1." should read -- claim 10 --.

Signed and Sealed this

Eleventh Day of September, 2001

Attest:

*Attesting Officer*

NICHOLAS P. GODICI
*Acting Director of the United States Patent and Trademark Office*